United States Patent
Lawrence et al.

(10) Patent No.: US 11,179,990 B2
(45) Date of Patent: Nov. 23, 2021

(54) BUSHING COLLAR ASSEMBLY

(71) Applicant: Honda Motor Co., Ltd., Tokyo (JP)

(72) Inventors: Claude B. Lawrence, Marysville, OH (US); Abhijith Sadananda, Dublin, OH (US); Christopher Dendis, Plain City, OH (US); Binoy J. Rodrigues, Inglewood, CA (US); Michael Joseph Zimcosky, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/804,541

(22) Filed: Feb. 28, 2020

(65) Prior Publication Data

US 2021/0268853 A1    Sep. 2, 2021

(51) Int. Cl.
     *B60G 7/00*      (2006.01)
     *F16C 17/02*      (2006.01)

(52) U.S. Cl.
     CPC ............ *B60G 7/001* (2013.01); *F16C 17/02* (2013.01); *B60G 2204/143* (2013.01); *B60G 2204/41* (2013.01); *F16C 2326/05* (2013.01)

(58) Field of Classification Search
     CPC ............... B60G 7/001; B60G 2204/41; B60G 2204/143; F16C 17/02; F16C 2326/05
See application file for complete search history.

(56) References Cited

U.S. PATENT DOCUMENTS

| | | | | |
|---|---|---|---|---|
| 1,942,578 A | * | 1/1934 | Stockfleth | F16C 33/14 29/898.057 |
| 2,367,817 A | * | 1/1945 | Brown | B60G 7/00 180/352 |
| 2,962,279 A | | 11/1960 | Wroby | |
| 3,531,850 A | | 10/1970 | Durand | |
| 5,100,114 A | | 3/1992 | Reuter et al. | |
| 5,879,026 A | * | 3/1999 | Dostert | B60G 7/02 280/781 |
| 7,267,485 B2 | | 9/2007 | Wagener et al. | |
| 9,797,443 B2 | | 10/2017 | Spinella | |
| 2014/0291907 A1 | * | 10/2014 | Endo | B60G 13/003 267/220 |
| 2016/0369860 A1 | * | 12/2016 | Trotter | F16F 1/3863 |

FOREIGN PATENT DOCUMENTS

| | | |
|---|---|---|
| CN | 107725651 | 2/2018 |
| JP | 2006046588 | 2/2006 |
| KR | 20110096264 | 8/2011 |
| WO | 2006108389 | 10/2006 |
| WO | 2018091271 | 5/2018 |

\* cited by examiner

*Primary Examiner* — Darlene P Condra
(74) *Attorney, Agent, or Firm* — Rankin, Hill & Clark LLP

(57) ABSTRACT

A bushing collar assembly on a vehicle includes a subframe formed of a first material and a bushing collar formed of a second material. The subframe has an engagement face. The bushing collar has a sleeve shaped main body defining axial end faces. At least one of the axial end faces has a plurality of spaced apart nubs disposed thereon that are configured to deform and fully embed into the engagement face of the subframe upon application of a predetermined compressive force.

20 Claims, 5 Drawing Sheets

BUSHING COLLAR ASSEMBLY

BACKGROUND

Suspension input loads on vehicles keep rising due to the use of larger wheels with smaller tires. In general, this has led to an increase in the size of primary chassis joints for handling these increasing input loads. Another option is to substantially increase the coefficient of friction in these joints. One means for increasing friction between a suspension bushing and the vehicle in which it is mounted is to provide a sawtooth design on an axial end face of the bushing. A drawback of such a sawtooth design is that it does not allow the end of the bushing to make full contact with the surface against which the bushing axial end face abuts (i.e., only distal ends of the teeth portions make contact). As such, there can be gaps between the bushing and the vehicle, particularly between the teeth, where water can potentially penetrate.

BRIEF DESCRIPTION

According to one aspect, a bushing collar assembly on a vehicle includes a subframe formed of a first material and a bushing collar formed of a second material. The subframe has an engagement face. The bushing collar has a sleeve shaped main body defining axial end faces. At least one of the axial end faces has a plurality of spaced apart nubs disposed thereon that are configured to deform and fully embed into the engagement face of the subframe upon application of a predetermined compressive force. The second material has a higher material hardness than the first material.

According to another aspect, a bushing collar assembly in a suspension system on a vehicle includes a base formed of a first material and a bushing collar formed of a second material. The base has an engagement face. The bushing collar defines axial end faces with at least one of the axial end faces having a plurality of spaced apart protuberances thereon that fully embed into the engagement face of the base upon application of a predetermined compressive force. The second material has a higher material hardness than the first material.

According to a further aspect, a chassis joint on a vehicle includes a subframe having an engagement face and a bushing collar having a sleeve shaped main body defining axial end faces. At least one of the axial end faces has a plurality of spaced apart nubs disposed thereon that are configured to deform and fully embed into the engagement face of the subframe upon application of a predetermined compressive force to increase slip friction between the bushing collar and the subframe.

DETAILED DESCRIPTION

Figure 1:
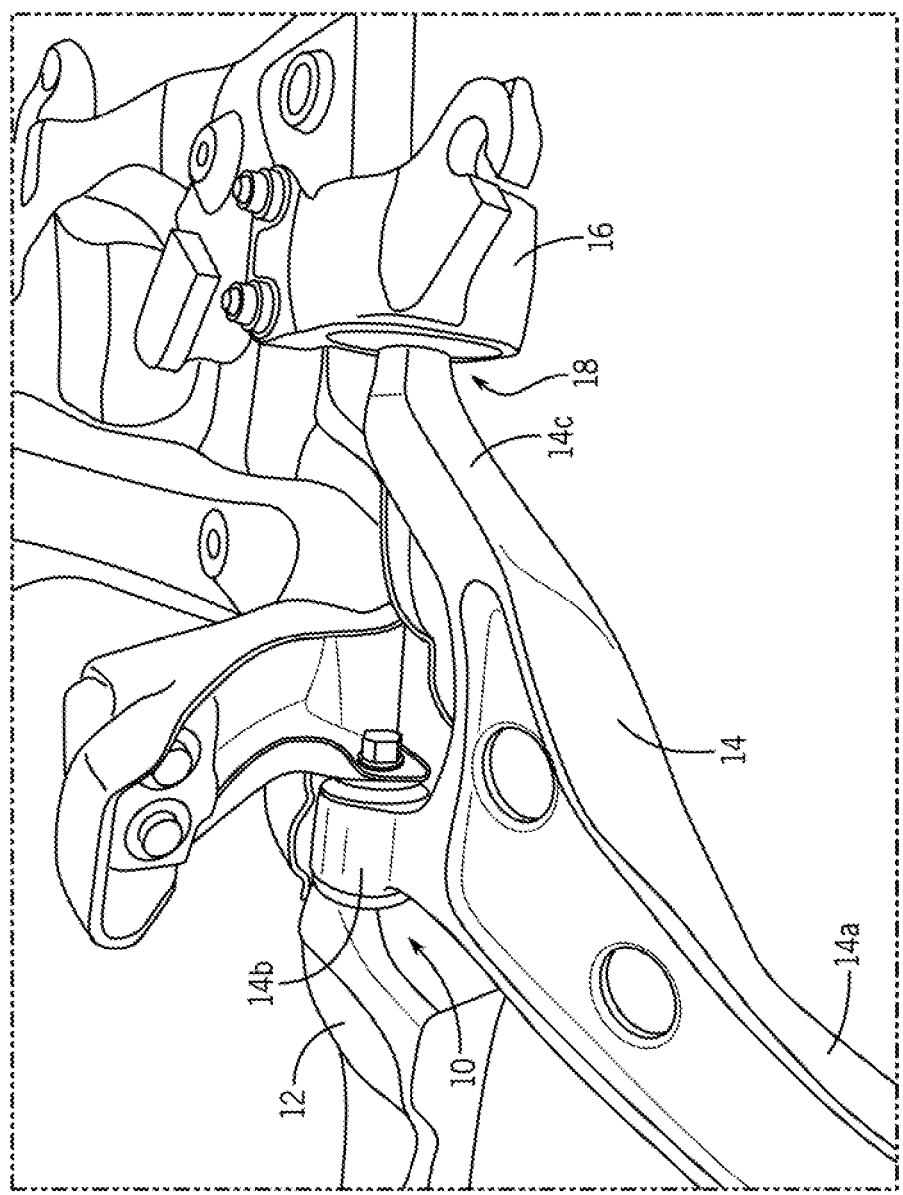
FIG. 1 is a partial perspective view of a bushing collar assembly having a suspension lower control arm mounted to a vehicle subframe via a bushing collar according to an exemplary embodiment.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 illustrates a chassis joint 10 on or for a vehicle, the chassis joint 10 also referred to herein as a bushing collar assembly. The bushing collar assembly 10 includes a subframe 12 and a suspension lower control arm 14 secured to the subframe 12. In the illustrated embodiment, the lower control arm 14 is an A-type lower control arm (i.e., has an "A" shape). However, it should be appreciated that the chassis joint 10 could be used in other suspension configurations, including for example A-type upper control arms, multi-link suspensions, etc.

In the illustrated embodiment, the control arm 14 includes a first end 14a for connecting to the vehicle's wheel (not shown). The control arm 14 also includes a second end comprised of second end leg portions or legs 14b and 14c. Each of the second end legs 14b, 14c are respectively connected to the vehicle. In particular, the second end leg 14b is connected to the subframe 12 via the bushing collar assembly 10, which will be described in further detail below. The second end leg 14c is connected to an intermediate bracket 16 via a chassis or suspension joint 18 and the intermediate bracket 16 can be mounted to the vehicle.

Figure 2:
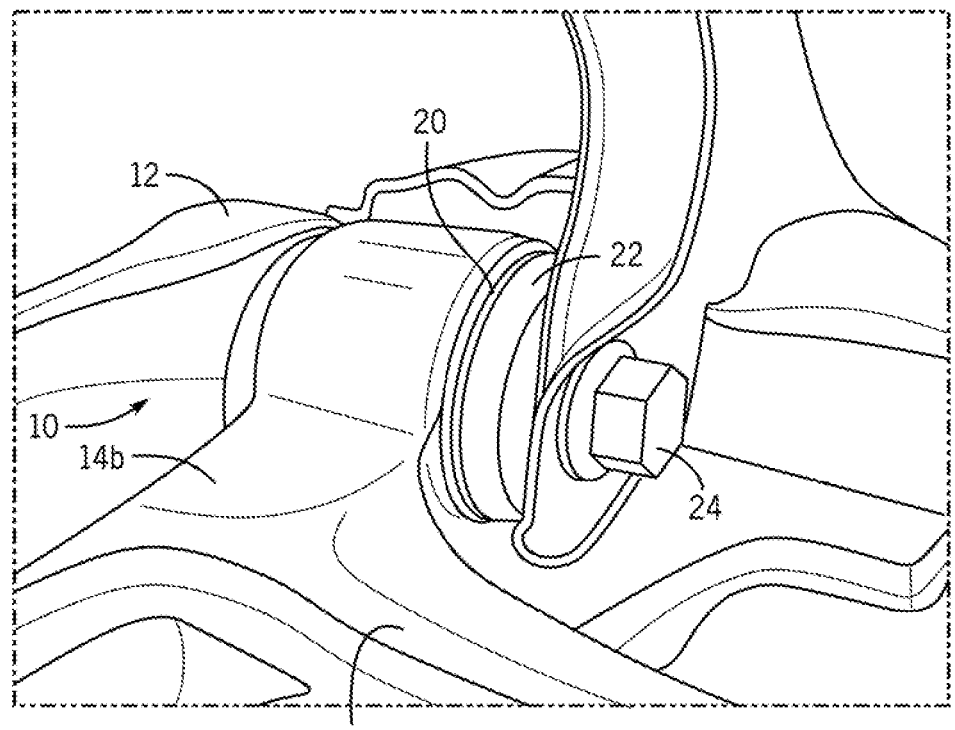
FIG. 2 is an enlarged partial perspective view of the bushing collar assembly of FIG. 1.

With additional reference to FIG. 2, the control arm 14, and particularly the second end leg 14b thereof, defines a mounting bore 20 through or into which a bushing collar 22 is received. Additionally, a threaded fastener or mounting bolt 24 is received through the subframe 12, the bushing collar 22, and the mounting bore 20 of the suspension lower control arm 14 to secure the suspension lower control arm 14 to the subframe 12. An opposite end of the mounting bolt 24 (not shown) is threadedly secured to a threaded locking member, such as a nut (not shown). In one embodiment, the nut is welded to the subframe 12 such that threaded engagement via the mounting bolt 24 secures the bushing collar 22 and the second end leg 14c of the control arm 14 to the subframe 12.

Figure 3:
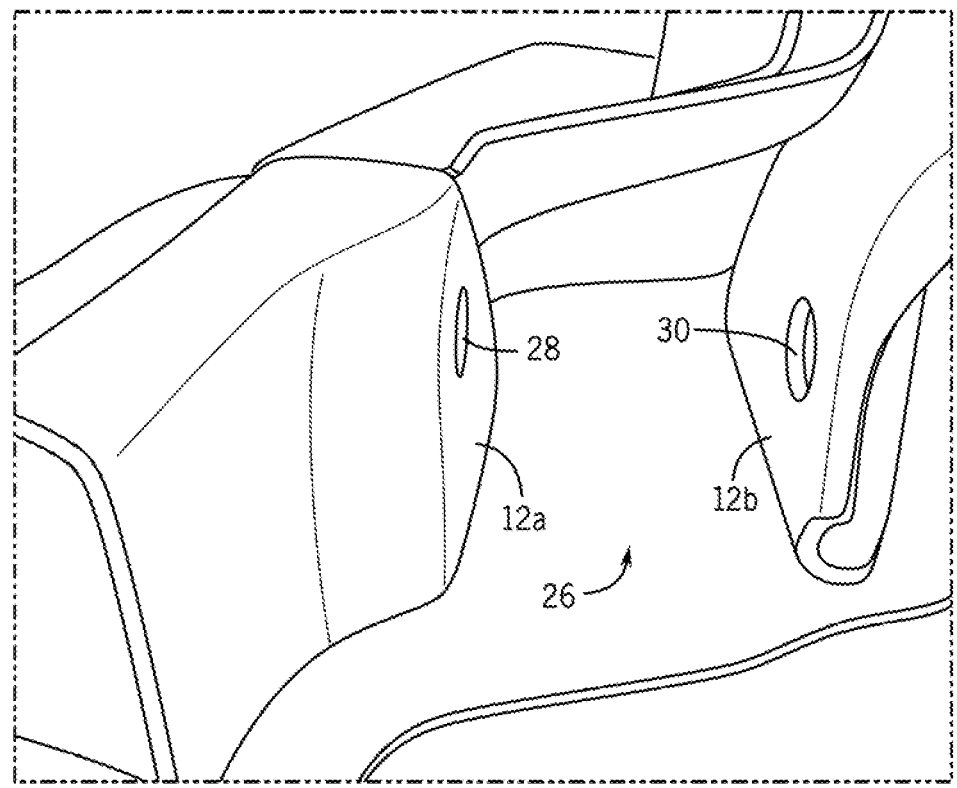
FIG. 3 is a partial perspective view of the bushing collar assembly shown with the suspension lower control arm and bushing collar removed to illustrate a recess in which the bushing collar is received.
Figure 4:
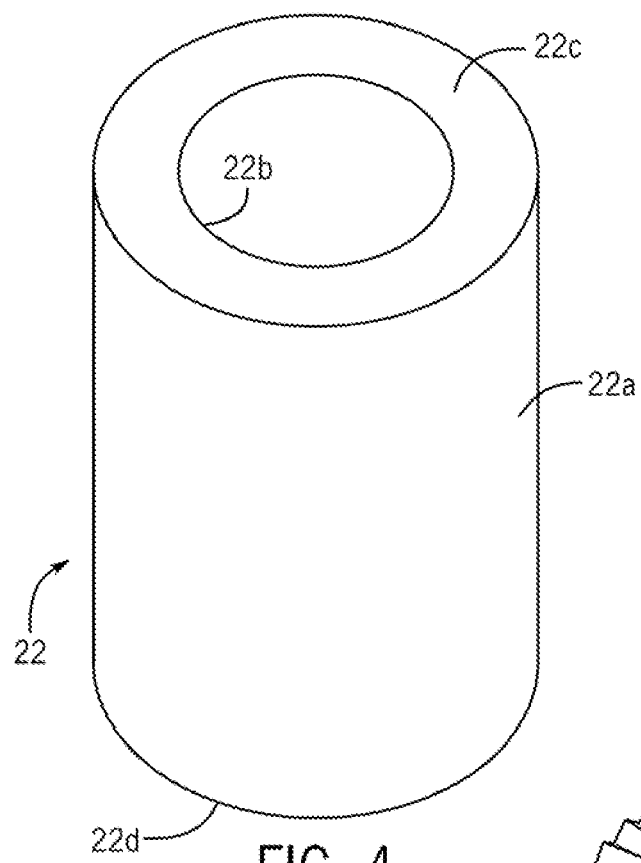
FIG. 4 is a perspective view of a known bushing collar.

With further reference to FIGS. 3 and 4, the subframe 12 is illustrated, particularly a portion thereof that is secured to by the control arm 14 via the bushing collar 22 and the mounting bolt 24. In particular, as shown, the subframe 12 defines a recess 26 into which the bushing collar 22 is received. Additionally, the subframe 12 has a first engagement face 12a and a second engagement face 12b. Each of the engagement faces 12a, 12b abut and thus are engaged by the bushing collar 22 as will be described in more detail below. As shown, each of the engagement faces 12a, 12b defines an aperture 28, 30 therethrough. The bushing collar 22, and particularly a sleeve shaped main body 22a thereof, is arranged within the recess 26 of the subframe 12 such that a central aperture 22b of the bushing collar 22 is in registry with each of the apertures 28, 30 of the engagement faces 12a, 12b so that the mounting bolt 24 can be passed therethrough. For reference, the nut (not shown) can be mounted on an opposite side of the engagement face 12a in registry with the aperture 28. The subframe 12 can also be referred to herein as a base or base material and, in alternate embodiments, the base 12 can be some other portion of the vehicle (e.g., the main vehicle frame or body).

In one embodiment, the subframe 12 can be formed of a first material and the bushing collar 22 can be formed of a second material, and the second material can have a higher material hardness than the first material. For example, the first material can be a material that has a yield strength of about 450 to about 650 MPa and the second material can be a material that has a yield strength of about 750 to about 850 MPa. By way of example only, the first material could be JSH 590R Steel having a yield strength of 478 MPa and/or the second material could be 4340 Ally Steel having a yield strength of 800 MPa. Of course, other materials with varying yield strengths could be used.

Figure 5:
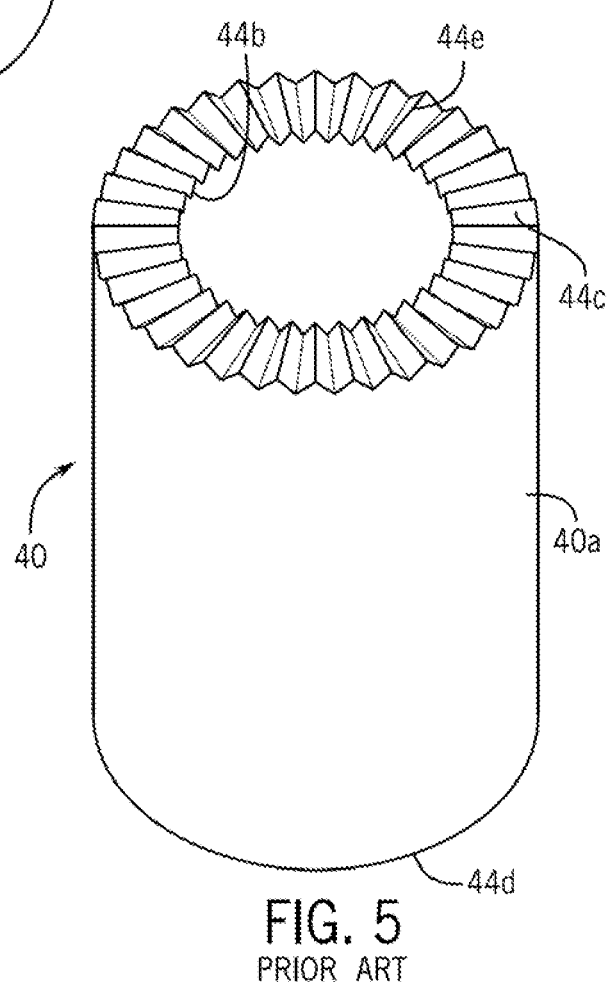
FIG. 5 is a perspective view of another known bushing collar.

As best shown in FIG. 4, the bushing collar 22 can have the sleeve shaped main body 22b defining axial end faces 22c, 22d. With additional reference to FIG. 5, a bushing collar 40 is illustrated according to a known design that can be substituted for the bushing collar 22 in the bushing collar assembly 10. In many respects, the bushing collar 40 can be the same or similar to the bushing collar 22 of FIG. 4. In particular, the bushing collar 40 can have a sleeve shaped main body 40a defining a central aperture 40b axially therethrough. Also, the bushing collar 40 can have its sleeved shaped main body 44a define axial end faces 44c, 44d. At least one of the axial end faces (e.g., axial end face 44c in FIG. 4) can have a sawtooth shape or design comprised of a plurality of annularly arranged sawteeth 44e. Optionally, though not shown, sawteeth can also be provided on the axial end face 44d. When the bushing collar 40 is used in place of the bushing collar 22 in the bushing collar assembly 10, the saw teeth 40e would engage the engagement face 12a of the subframe 12. The saw teeth 40e do not allow for the axial end face 40c of the bushing collar 40 to make full contact with the engagement face 12a of the subframe 12. As such, there can be gaps between the axial end face 40c and the engagement face 12a, particularly between the saw teeth 40e. Through such gaps water can penetrate, which is not desirable.

Figure 6:
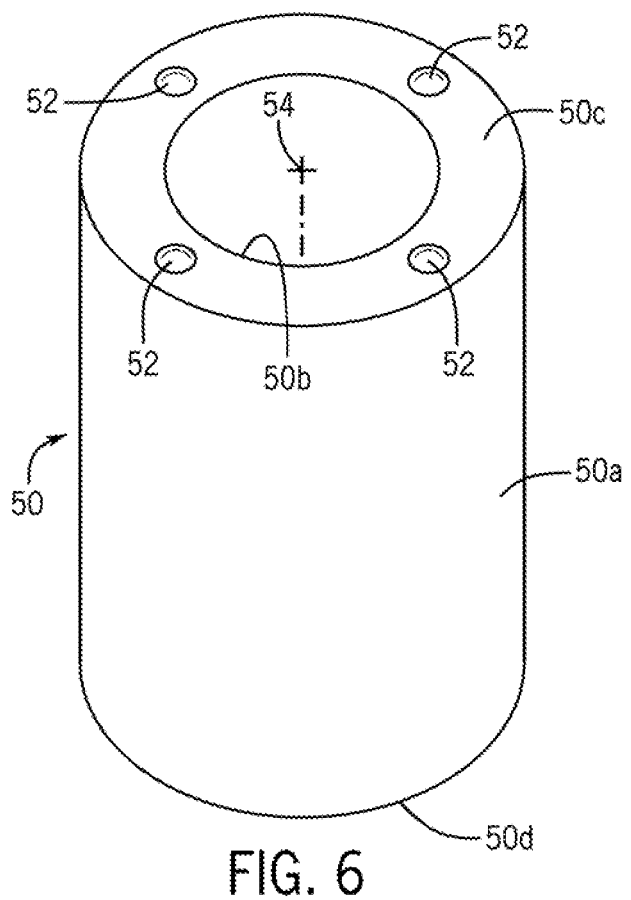
FIG. 6 is a perspective view of a bushing collar according to an exemplary embodiment.

With reference to FIG. 6, a bushing collar 50 is illustrated according to an exemplary embodiment. The bushing collar 50 can be the same or similar to the bushing collar 22 in many respects except as noted hereinbelow. In particular, the bushing collar 50 includes or has a sleeved shaped main body 50a defining a central aperture 50b axially therethrough and defining axial end faces 50c, 50d. At least one of the axial end faces (e.g., axial end face 50c) of the bushing collar 50 can have a plurality of spaced apart protuberances or nubs 52 disposed thereon that are configured to deform and fully embed into the engagement face 12a of the subframe 12 upon application of a predetermined compressive force, such as the compressive force applied via the mounting bolt 24 when threadedly secured to the subframe 12 to mount the control arm 14 to the subframe 12.

Figure 7:
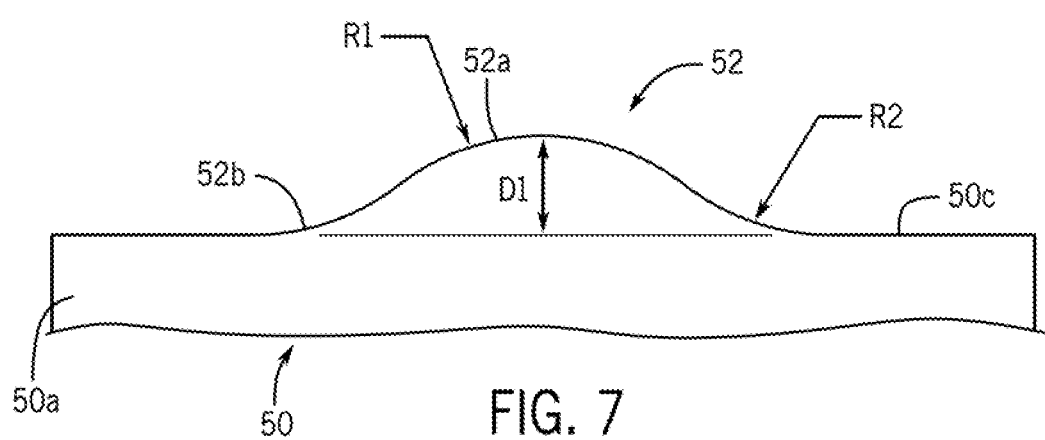
FIG. 7 is a schematic cross-section view of a nub of the bushing collar of FIG. 6.

With additional reference to FIG. 7, each of the plurality of spaced part nubs 52 can have a circular shape. Likewise, in the illustrated embodiment, each of the plurality of spaced apart nubs 52 can have a dome shape. In particular, with specific reference to FIG. 7, each of the plurality of spaced apart nubs 52 of the illustrated embodiment can have a curved upper surface 52a and a curved circumferential base 52b that transitions smoothly from the curved upper surface 52a to the axial end face 50c. In one embodiment, a height D1 from the axial end face 50c to a distal-most portion of the curved upper surface 52a can be 0.5 mm. A radius R1 of the curved upper surface can be 1.25 mm and a radius R2 of the curved circumferential base 52b can be 1.0 mm. As such, the height dimension D1 for each of the plurality of spaced apart nubs 52 in the illustrated embodiment is about one-half a radius of the curved circumferential base 52b, though this is not required. Moreover, the foregoing dimensions are merely exemplary and are not intended to limit the nub to an exact shape as other dimensions could be used.

As shown in FIG. 6, the plurality of spaced part nubs 52 can be circumferentially spaced apart the axial end face 50c of the bushing collar 50. Additionally, and also as shown, the circumferential spacing between adjacent ones of the plurality of spaced apart nubs 52 can be equidistant, as can a radially distance defined between each nub and a central axis 54 of the bushing collar 50. That is, the same distance circumferentially about the axial end face 50c can be provided between adjacent ones of the nubs 52. Further, in the illustrated embodiment, the plurality of spaced apart nubs 52 can include at least four nubs 52, though this is not required and fewer than four nubs or more than four nubs could be used.

Figure 8:
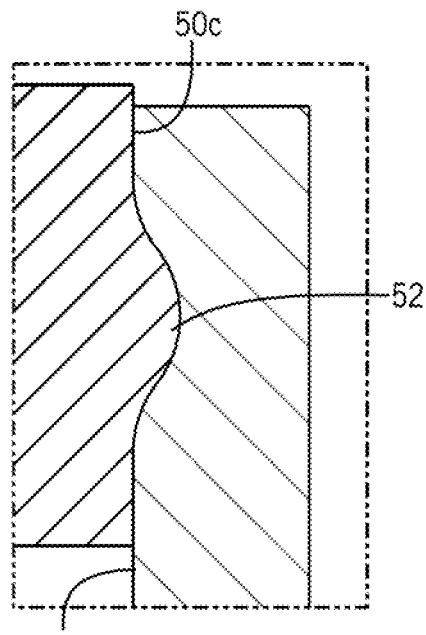
FIG. 8 is a schematic cross-section view showing the nub of the bushing collar fully embedded into the subframe.

With additional reference to FIG. 8, advantageously, a water tight seal can be formed between the engagement face 12a and the axial end face 50c when the bushing collar 50 is installed due to the plurality of spaced apart nubs 52 fully embedding to the engagement face 12a. In particular, the mounting bolt 24 can apply the predetermined compressive force that is sufficient to urge the plurality of spaced apart nubs 52 into the engagement face 12a of the subframe 12 so as to deform the engagement face 12a and fully embed into the engagement face 12a. In addition to providing a water tight seal, such embedding of the plurality of spaced apart nubs 52 into the engagement face 12a can increase slip friction between the bushing collar 50 and the subframe 12, and particularly the engagement face 12a of the subframe. Though not shown, the same pattern of spaced apart nubs can be provided on the opposite axial end face 50d if desired so as to provide the same benefits with respect to the engagement face 12b of the subframe 12.

Figure 9:
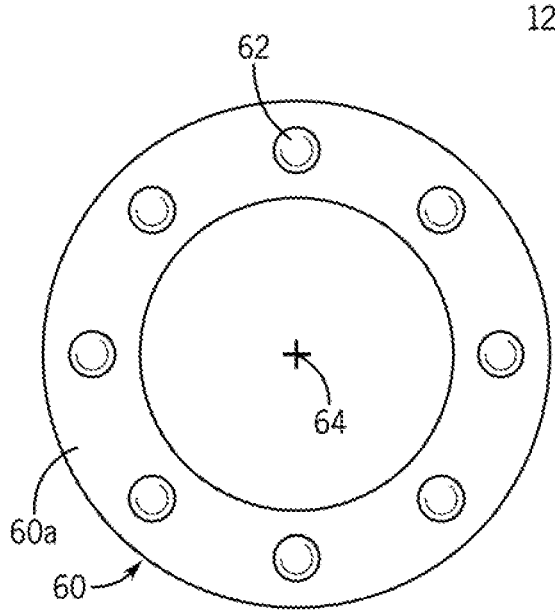
FIG. 9 is an axial end elevation view of a bushing collar according to an alternate exemplary embodiment.

With reference to FIG. 9, an axial end face 60a is shown of a bushing collar 60 according to an alternate exemplary embodiment. As shown, the axial end face 60a of the bushing collar 60 can include a plurality of spaced apart nubs 62 that are more numerous than the nubs 52 of the bushing collar 50. In particular, in FIG. 9, the plurality of spaced apart nubs 62 includes at least eight nubs. Like the nubs 52, the nubs 62 of FIG. 9 can be circumferentially spaced apart around the axial end face 60a of the bushing collar 60 such that circumferential spacing between adjacent ones of the plurality of spaced apart nubs 62 is equidistant. Additionally, a radial distance to each nub 62 from a central axis 64 of the bushing collar 60 can be equidistant. In all other respects, the nubs 62 can be shaped like the nubs 52.

Figure 10:
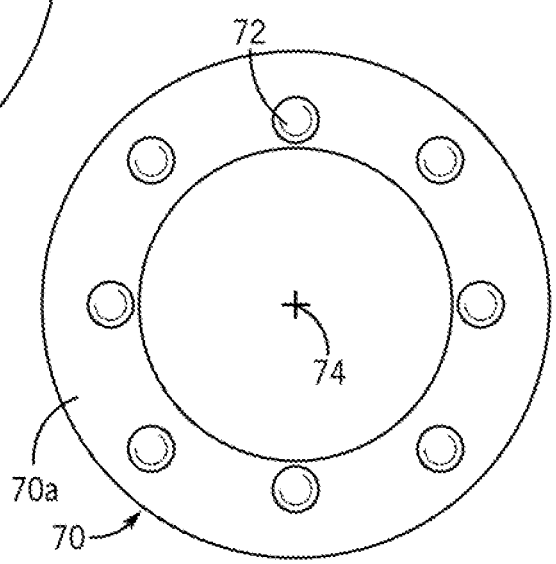
FIG. 10 is an axial end elevation view of another bushing collar according to another exemplary embodiment.

With reference now to FIG. 10, an axial end face 70a of a bushing collar 70 is shown according to yet a further alternative embodiment. The bushing collar 70 includes a plurality of spaced apart nubs 72 that are not equidistant. More particularly, the nubs 72 are circumferentially spaced apart around the axial end face 70a of the bushing collar 70 but circumferential spacing between adjacent ones of the plurality of spaced apart nubs 72 is not equidistant. Also, a radial distance to each of the nubs 72 from a central axis 74 is not equidistant. These alternate bushing collars 60 and 70, and other variations thereof, can be used when varying slip friction is desired between the bushing collar and the subframe 12.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A bushing collar assembly on a vehicle, comprising:
a subframe formed of a first material, the subframe having an engagement face; and
a bushing collar formed of a second material, the bushing collar having a sleeve shaped main body defining axial end faces, at least one of the axial end faces has a plurality of spaced apart nubs disposed thereon that are configured to deform and fully embed into the engagement face of the subframe upon application of a predetermined compressive force, wherein the second material has a higher material hardness than the first material.

2. The bushing collar assembly of claim 1, wherein each of the plurality of spaced apart nubs has a circular shape.

3. The bushing collar assembly of claim 1, wherein each of the plurality of spaced apart nubs has a dome shape.

4. The bushing collar assembly of claim 1, wherein each of the plurality of spaced apart nubs has a curved upper surface and a curved circumferential base that transitions smoothly from the curved upper surface to said at least one axial end face.

5. The busing collar assembly of claim 4 wherein a height dimension for each of the plurality of spaced apart nubs is about one half a radius of the curved circumferential base.

6. The bushing collar assembly of claim 1 wherein the first material has a yield strength of about 450 to about 650 MPa and the second material has a yield strength of about 750 to about 850 MPa.

7. The bushing collar assembly of claim 1 wherein the plurality of spaced apart nubs are circumferentially spaced apart around said at least one axial end face of the bushing collar.

8. The bushing collar assembly of claim 7 wherein circumferential spacing between adjacent ones of the plurality of spaced apart nubs is equidistant.

9. The bushing collar assembly of claim 7 wherein circumferential spacing between adjacent ones of the plurality of spaced apart nubs is not equidistant.

10. The bushing collar assembly of claim 1 wherein the plurality of spaced apart nubs includes at least four nubs.

11. The bushing collar assembly of claim 1 wherein the plurality of spaced apart nubs includes at least eight nubs.

12. The bushing collar assembly of claim 1 wherein a watertight seal is formed between the engagement face and said at least one axial end face due to the plurality of spaced apart nubs fully embedding into the engagement face.

13. The bushing collar assembly of claim 1 further including a suspension lower control arm defining a mounting bore into which the bushing collar is received, the suspension lower control arm secured to the subframe.

14. The bushing collar assembly of claim 13 further including a mounting bolt received through the subframe, the bushing collar and the mounting bore of the suspension lower control arm to secure the suspension lower control arm to the subframe, the mounting bolt applying the predetermined compressive force to urge the plurality of spaced apart nubs into the engagement face of the subframe.

15. A bushing collar assembly in a suspension system on a vehicle, comprising:
a base formed of a first material, the base having an engagement face; and
a bushing collar formed of a second material defining axial end faces with at least one of the axial end faces having a plurality of spaced apart protuberances thereon that fully embed into the engagement face of the base upon application of a predetermined compressive force, wherein the second material has a higher material hardness than the first material.

16. The bushing collar assembly of claim 15 wherein the base is a subframe that defines a recess in which the bushing collar is received, the engagement face defining one side of the recess.

17. The bushing collar assembly of claim 16 further including a suspension lower control arm defining a mounting bore into which the bushing collar is received, the suspension lower control arm having one leg portion in which the mounting bore is defined that is itself received in the recess of the subframe and mounted to the subframe via a threaded fastener received through the mounting bore, the bushing collar and mounting apertures defined in the subframe.

18. The bushing collar assembly of claim 15 wherein the protuberances are circumferentially spaced apart on said at least one axial face.

19. The bushing collar assembly of claim 15 wherein said at least one axial end face includes both axial end faces.

20. A chassis joint on a vehicle, comprising:
a subframe having an engagement face; and
a bushing collar having a sleeve shaped main body defining axial end faces, at least one of the axial end faces has a plurality of spaced apart nubs disposed thereon that are configured to deform and fully embed into the engagement face of the subframe upon application of a predetermined compressive force to increase slip friction between the bushing collar and the subframe.

\* \* \* \* \*